(12) United States Patent
Salomon et al.

(10) Patent No.: US 11,518,851 B2
(45) Date of Patent: Dec. 6, 2022

(54) CONCENTRATED SOLUTION OF POLY(FURFURYL ALCOHOL) FOR SIZING ORGANIC OR MINERAL FIBRES

(71) Applicant: SAINT-GOBAIN ISOVER, Courbevoie (FR)

(72) Inventors: Pierre Salomon, Courbevoie (FR); Boris Jaffrennou, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 580 days.

(21) Appl. No.: 16/493,128

(22) PCT Filed: Mar. 14, 2018

(86) PCT No.: PCT/FR2018/050612
§ 371 (c)(1),
(2) Date: Sep. 11, 2019

(87) PCT Pub. No.: WO2018/167429
PCT Pub. Date: Sep. 20, 2018

(65) Prior Publication Data
US 2020/0079904 A1    Mar. 12, 2020

(30) Foreign Application Priority Data
Mar. 15, 2017 (FR) ..................... 17 52107

(51) Int. Cl.
*C08J 3/07* (2006.01)
*C08G 65/36* (2006.01)
*D06M 15/53* (2006.01)

(52) U.S. Cl.
CPC ............. *C08G 65/36* (2013.01); *C08J 3/07* (2013.01); *D06M 15/53* (2013.01); *D06M 2200/40* (2013.01)

(58) Field of Classification Search
CPC .......... C08G 65/36; C08J 3/07; D06M 15/53; D06M 2200/40
USPC ....................................... 156/180
See application file for complete search history.

(56) References Cited

U.S. PATENT DOCUMENTS 2,471,631 A    5/1949    Lebach
5,589,536 A   12/1996    Golino et al.

FOREIGN PATENT DOCUMENTS

| FR | 1.142.264 | 9/1957 |
|---|---|---|
| JP | 2012-17349 A | 1/2012 |
| JP | 2013-245286 A | 12/2013 |
| JP | 2014-1356 A | 1/2014 |
| WO | WO 93/25490 A2 | 12/1993 |

OTHER PUBLICATIONS

Machine Translation of JP 2014-001356. (Year: 2014).*
International Search Report dated May 30, 2018 in PCT/FR2018/050612 filed Mar. 14, 2018.

* cited by examiner

*Primary Examiner* — Hannah J Pak
(74) *Attorney, Agent, or Firm* — Oblon, McClelland, Maier & Neustadt, L.L.P.

(57) ABSTRACT

The present invention relates to an aqueous poly(furfuryl alcohol) solution containing:
from 40% to 85% by weight of poly(furfuryl alcohol),
from 15% to 60% by weight of water and
less than 1.5% by weight of furfuryl alcohol, said solution being characterized in that it exhibits a pH of greater than 7.0, preferably of between 7.2 and 10.0. The invention also relates to a process for the manufacture of a product based on mineral or organic fibers which are bonded by an organic binder, using such an aqueous poly(furfuryl alcohol) solution in the diluted form.

21 Claims, 1 Drawing Sheet

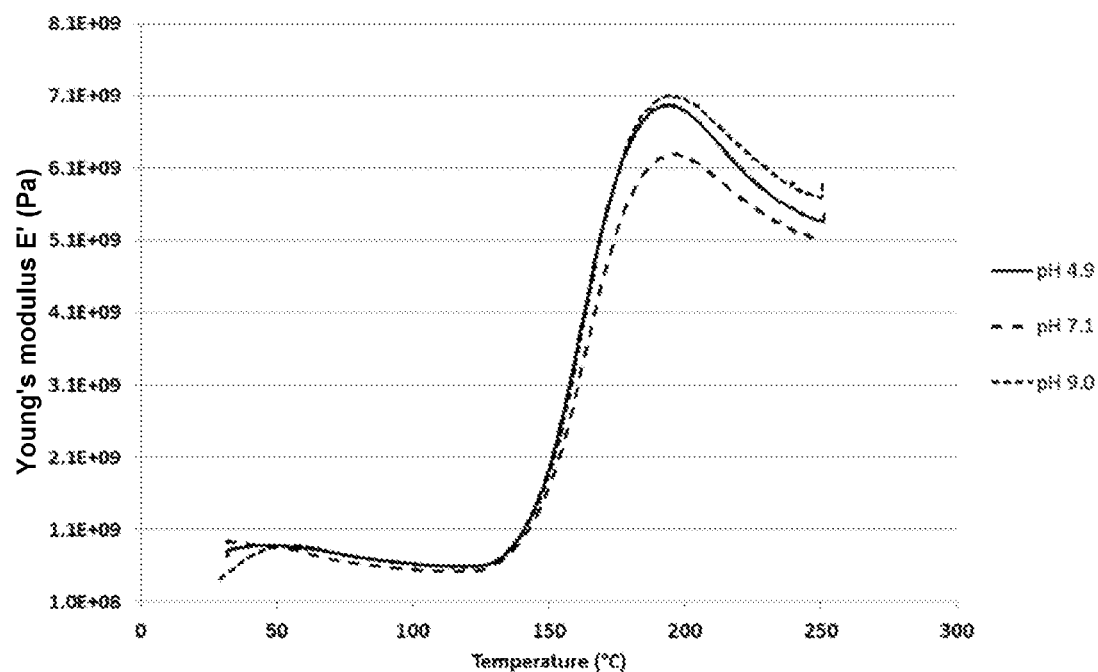

CONCENTRATED SOLUTION OF POLY(FURFURYL ALCOHOL) FOR SIZING ORGANIC OR MINERAL FIBRES

The present invention relates to a concentrated solution of furfuryl alcohol oligomers which is stable in storage. It also relates to the use of such a concentrated solution for the manufacture of sizing compositions for mineral or organic fibers and also to a process for the manufacture of products based on mineral or organic fibers bonded by a binder based on poly(furfuryl alcohol).

Furfuryl alcohol is manufactured industrially by reduction of furfural obtained from certain cellulose materials or plant waste, such as sugar cane bagasse, cereal bran, olive cakes or softwood. It has been used for several decades in the manufacture of sand casting molds. Furfuryl alcohol, which is highly liquid, exhibits a good affinity for the sand, which it readily penetrates. In the presence of an acid, such as phosphoric acid, it polymerizes and cures rapidly to form a three-dimensional polymeric network which agglomerates the sand grains.

The volatility, flammability and toxicity of furfuryl alcohol requires precautions in use. Its use as binder by direct application by spraying over fibers has not been found to date.

It has been envisaged to use polyfuran resins, that is to say liquid compositions containing furfuryl alcohol oligomers or (co)polymers as binders for mineral fibers, for partially or completely replacing the formaldehyde-based (urea-formaldehyde, phenol-formaldehyde, melamine-formaldehyde) resins conventionally used in the manufacture of insulation products based on mineral wool (see, for example, WO 93/25490, WO94/26676, WO94/26677 and WO94/26798). The "furan" or "polyfuran" resins described in these documents are mixtures of monomers, oligomers and polymers obtained by polycondensation, in an acid medium, of monomers having a "furan" nucleus and optionally of other comonomers, such as anhydrides, aldehydes, ketones, urea, phenol, and the like.

Two furan resins are described in more detail, in particular in WO94/26677, as being commercial products, namely the products Farez™ M (QO Chemicals), a resin of furfuryl alcohol and of urea-formaldehyde containing 6% of residual furfuryl alcohol and also from 0.4% to 1.1% of formaldehyde, and Quacorr™ 1300 (QO Chemicals), a resin obtained by polycondensation of furfuryl alcohol having a residual content of furfuryl alcohol of between 2% and 18%.

These two resins exhibit an acid pH (pH 4-7), are not infinitely dilutable with water and form cloudy compositions beyond a certain water content (cloud point). In order to be able to prepare single-phase binders of acceptable viscosity, it is necessary to add organic solvents to them.

Furthermore, in order to obtain binder compositions which are sufficiently reactive, organic or mineral acids are systematically added to the diluted binder compositions before application to mineral fibers and curing of the binder in a drying oven.

Another commercially available furan resin is the BioRez™ resin (TransFurans Chemicals, Belgium) obtained by polycondensation of furfuryl alcohol in the presence of an acid catalyst. It exhibits an acid pH between approximately 4.5 and 5.5, a low content of furfuryl alcohol (less than 1% of the commercial aqueous composition) and a viscosity at 25° C. of less than 1000 mPa·s at 75% solids content.

The applicant company, when it has wished to use this resin in the preparation of sizing compositions, also known as binders, was confronted with the instability of the resin. This is because the viscosity of the concentrated solution continually increased, rendering it unsuitable for storage, which made it necessary either to consume it within a very short period of time, of a few hours or days only, or else to store it in a refrigerated environment. This instability is particularly harmful to a large-scale industrial use in which the binder compositions have to be transported over large distances between the station of storage and the station of use, and may remain in the pipes in the event of shutdown of the process.

This increase in the viscosity has been attributed by the applicant company to the presence of the polycondensation acid catalyst still present in the commercial resin and regarded as essential to good reactivity of the resin after application.

The present invention is based on the discovery that the stability on storage of the concentrated aqueous solution of poly(furfuryl alcohol) could be spectacularly increased by simple neutralization and basification of the solution above pH 7. The addition of an aqueous ammonia ($NH_4OH$) solution until a basic solution is obtained made its possible to slow down, indeed even to halt, the increase in the viscosity and to transport the resin in the concentrated form at ambient temperature and then to store it for several weeks in an unrefrigerated environment.

The applicant company has been particularly surprised to find that the stabilized concentrated resin could, despite its basic pH, be used as is in the preparation of sizing compositions for mineral or organic fibers by simple dilution with water, without it being necessary to add an acid catalyst to it in order to compensate for the loss of reactivity resulting from the increase in the pH.

This discovery goes against a strong conviction prevailing in the technical field of casting molds and binders for mineral fibers according to which the polymerization and the curing of compositions based on furfuryl alcohol or on furfuryl alcohol oligomers necessarily requires an acidic medium, that is to say the presence of a high concentration of protons.

A subject matter of the present patent application is thus a concentrated aqueous composition of furfuryl alcohol oligomers, which exhibits a basic pH and is for this reason stable on storage, and also a process for the manufacture of fiber-based products using a sizing composition obtained by dilution of this concentrated composition.

More specifically, a subject matter of the present patent application is an aqueous poly(furfuryl alcohol) solution containing:

from 40% to 85% by weight of poly(furfuryl alcohol),
from 15% to 60% by weight of water and
less than 1.5% by weight of furfuryl alcohol, said solution being characterized in that it exhibits a pH of greater than 7.0, preferably of between 7.2 and 10.0.

The aqueous poly(furfuryl alcohol) solution of the present invention is preferably essentially composed:

of water,
of furfuryl alcohol oligomers, hereinafter known as poly(furfuryl alcohol),
of unreacted residual furfuryl alcohol,
of a salt resulting from the neutralization of the organic or mineral acid which has been used as polycondensation catalyst,
of an excess of base (alkaline pH).

It is, of course, impossible to provide here an exhaustive list of the components which are not present in the resin composition of the present invention. The applicant company intends more particularly to protect resin solutions which are devoid of formaldehyde, and preferably resin solutions which are devoid of formaldehyde and in addition of monomer reactants conventionally used in the preparation of formaldehyde-based resins, such as phenol, cresols, urea, amines and alkanolamines, and melamine.

This absence of amines does not, of course, exclude neutralizing the catalyst with an organic amine (weak base). In this case, the amount of amine added to the aqueous poly(furfuryl alcohol) solution is generally less than 5% by weight, preferably less than 4% by weight, with respect to the total dry weight of the solution.

The aqueous poly(furfuryl alcohol) solution of the present invention might, on the other hand, contain a certain number of additives conventionally present in the dilute binding compositions intended to be applied to the fibers. These additives are normally added at the time of the dilution of the composition but nothing in principle prohibits them from being already added to the concentrated composition which it will be sufficient subsequently to simply dilute with water. Of course, these additives must be chemically stable and not react with the components of the resin solution of the present invention during the transportation and storage of the latter.

Mention may be made, by way of example of such additives, of:
- coupling agents chosen from functional silanes; a functional silane generally comprises at least one, preferably two or three, hydrolyzable alkoxysilyl functional groups and at least one reactive functional group (oxirane, amine, hydroxyl, halide functional group) carried by a nonhydrolyzable organic group bonded to the silicon atom by an Si—C bond;
- hydrophobizing agents, for example silicones;
- dust-preventing agents, in particular mineral oils generally added in the form of an aqueous emulsion, optionally in the presence of one or more surface-active agents;
- colorants.

The aqueous poly(furfuryl alcohol) solution of the present invention is, however, preferably devoid of such additives and the poly(furfuryl alcohol) and the water together advantageously represent at least 95% by weight of the solution, preferably at least 96% by weight of the solution, in particular at least 97% by weight of the solution and ideally at least 98% by weight of the solution.

Its concentration of poly(furfuryl alcohol) is preferably between 50% and 80% by weight and in particular between 60% and 77% by weight, these percentages being expressed with respect to the total weight of the solution and do not encompass the residual content of furfuryl alcohol monomer.

As indicated above, the poly(furfuryl alcohol) denotes in this instance a product of the self-condensation of furfuryl alcohol existing in the form of oligomers comprising at least two furan units, if appropriate of a mixture of oligomers of variable molecular weight.

The residual content of furfuryl alcohol monomer of the solution of the present invention is preferably as low as possible. This is because furfuryl alcohol (CAS number 98-00-0) is a volatile organic compound (VOC) regarded as harmful by skin contact, inhalation and ingestion.

The concentrated resin solution of the present invention thus preferably contains less than 1.0% by weight, more preferably less than 0.5% by weight and ideally less than 0.2% by weight of furfuryl alcohol.

Its pH is basic, that is to say strictly greater than 7.0, preferably between 7.2 and 10, more preferably between 7.3 and 9.5, in particular between 7.4 and 9.0 and ideally between 7.5 and 8.5.

The aqueous poly(furfuryl alcohol) solution is preferably not a buffered solution.

When the poly(furfuryl alcohol) is obtained by a reaction in acid catalysis, the amount of base added is at least equal to the amount necessary to neutralize the residual acid in the unpurified reaction product.

The pH of the aqueous poly(furfuryl alcohol) solution can be adjusted by simple addition of a volatile or nonvolatile organic or mineral base, for example by addition of an aqueous solution of NaOH, of KOH, of ammonia ($NH_4OH$) or of an amine, for example of a primary or secondary amine. Use is preferably made of aqueous ammonia and/or primary or secondary amines. In an advantageous embodiment, the amine is a polyamine preferably comprising from 2 to 5 primary/secondary amine functional groups, or an aminated polymer, such as polyethyleneimine.

The viscosity of the solution can vary within wide limits. It depends not only on the degree of polymerization of the furfuryl alcohol oligomer but also on other parameters, such as the temperature and the concentration of the solution. The Brookfield viscosity of the poly(furfuryl alcohol) resin solutions is measured at 20° C. using a Brookfield viscometer, after adjustment of the dry matter content, by addition of deionized water, to 40% by weight. Under these conditions, it is preferably between 1 and 1000 mPa·s, more preferably between 2 and 500 mPa·s, in particular between 3 and 100 mPa·s.

Normally, the viscosities above a few tens of mPa·s are too high to make possible the application of the poly(furfuryl alcohol) solution as such to organic or mineral fibers by spraying, immersion or coating. The concentrated aqueous solution thus has to be prediluted, preferably by addition of water, generally by addition of 5 to 100 volumes of water per volume of concentrated solution, without appearance of a cloudiness (cloud point) which corresponds to a separation of phases.

The aptitude for dilution, or "dilutability", of a concentrated resin solution is defined as being the volume of deionized water which it is possible, at a given temperature, to add to a unit of volume of the aqueous resin solution before the appearance of a permanent cloudiness. It is generally considered that a resin is capable of being used as size when its dilutability is equal to or greater than 1000%, at 20° C.

The aqueous poly(furfuryl alcohol) solution advantageously exhibits a dilutability of greater than 1000%, preferably of greater than 2000%.

Another subject matter of the invention is a process for the manufacture of a poly(furfuryl alcohol) solution as described above, comprising a stage of self-condensation of furfuryl alcohol in the aqueous phase in the presence of an acid catalyst, said process being characterized in that a base is added to the product of the self-condensation reaction in order to adjust its pH to a value of greater than 7.0. The self-condensation reaction is preferably carried out until the content of free furfuryl alcohol monomer is less than 3.7%, with respect to the total weight of solids, in particular less than 1%, advantageously less than 0.5%, indeed even less than 0.3%, with respect to the total weight of solids.

Another subject matter of the present invention is a process for the manufacture of a product based on mineral or organic fibers which are bonded by an organic binder, said process comprising:
  (a) the preparation of a binding composition exhibiting a pH of greater than 7.0, preferably of between 7.2 and 10, by dilution with water of an aqueous poly(furfuryl alcohol) solution as described above,
  (b) the application of the binding composition to mineral or organic fibers,
  (c) before or after stage (b), formation of an assemblage of mineral or organic fibers,
  (d) heating the assemblage of sized mineral or organic fibers until the binding composition cures.

Stage (a) of preparation of the binding composition preferably does not comprise the addition of an acid to the aqueous poly(furfuryl alcohol) solution. This is because the applicant company has found that, contrary to the existing technical preconceptions, the polycondensation of the furfuryl alcohol oligomers present in the binding composition takes place satisfactorily at the time of the curing stage, even in the absence of acid catalyst, that is to say at basic pH.

This is because the products based on fibers and on a polyfuran binder obtained from a basic sizing solution exhibit mechanical properties which are very similar, indeed even identical, to those of equivalent products obtained with an acidic sizing solution.

Stage (a) can additionally comprise the addition of different adjuvants specific for the uses envisaged for the final product.

In the field of glass or rock wools, the adjuvants are chosen in particular from coupling agents (for example (aminoalkyl)alkoxysilanes or (epoxyalkyl)alkoxysilanes), dust-preventing agents (oils, in particular mineral oils) and hydrophobizing agents (especially silicones).

Use may also be made of colorants, softening or conditioning agents, for example surfactants, chemically inert soluble fillers, and also particulate solid additives, such as opacifying agents. The total content of adjuvants and additives generally does not exceed 20% to 25% by weight of the solid fraction of the binding composition.

The binding composition diluted from the poly(furfuryl alcohol) solution advantageously exhibits a dry matter content of between 2% and 20% by weight, preferably between 2.5% and 15% by weight and in particular between 3% and 10% by weight. These percentages encompass the optional adjuvants added.

The aqueous poly(furfuryl alcohol) solution of the present invention can be used to bind organic or mineral fibers. The organic fibers can be natural, artificial (that is to say, natural fibers which have undergone a chemical modification) or synthetic fibers.

The mineral fibers are in particular glass fibers and rock fibers.

The fibers can be assembled:
  into flexible mats, for example glass wool or rock wool mats, which can be rolled up and can be compressed,
  into boards of fibers which are denser and more rigid than the mats which can be rolled up,
  into fiber-based molded products, for example linings of conduits or pipes,
  into woven or nonwoven textiles, such as nonwoven mats of glass or organic fibers.

In a preferred embodiment of the process of the invention, the application of the binding composition to mineral or organic fibers (stage (b)) is carried out by spraying by means of spray nozzles.

This stage (b) of application of the binding composition to the mineral or organic fibers preferably precedes the stage (c) of assembling the fibers, that is to say that the diluted binding composition is applied to the fibers, preferably by spraying, before gathering together the sized fibers, for example in a mold or on a conveyor, and subsequently heating them in order to crosslink and cure the binder.

In a preferred embodiment of the process according to the invention, the fibers are mineral fibers and the assemblage of mineral fibers exhibits, after the curing stage (d), a loss on ignition (LOI) of between 1% and 20%, preferably between 1% and 7%, by weight.

Stage (d) comprises the heating of the assemblage of fibers at a temperature preferably of between 120 and 250° C. for a heating time of between 1 and 10 minutes, preferably in a thermally regulated chamber, such as a forced air drying oven, in which hot gases of controlled temperature are introduced into one or more compartments, a microwave drying oven, or a heating mold having fluid circulation or heating resistance.

EXAMPLE 1

Three aqueous poly(furfuryl alcohol) solutions having a dry matter content of 30% are prepared by dilution of BioRez™ resin (TransFurans Chemicals, Belgium) and then their pH is adjusted by addition of aqueous ammonia ($NH_4OH$) to a value of 4.9, of 7.1 and of 9.0 respectively.

A 55 mm×6 mm rectangle cut from a filter of nonbonded glass microfibers (Whatman, reference 1822-150) is impregnated with approximately 300 mg of each of these solutions.

These rectangles impregnated with resin solution are introduced into a dynamic mechanical thermal analysis (DMTA) device and the temperature of the sample holder is gradually increased (4° C./minute), starting from 25° C., up to 250° C., the storage modulus (E') in 3-point bending (frequency of 1 Hz, strain of 0.1%) being continuously measured.

FIG. 1 shows the change in the storage modulus as a function of the temperature for each of the three samples (pH 4.9, pH 7.1, pH 9.0).

It may be observed that the crosslinking temperature is essentially the same for the three samples, that is to say that a sample according to the invention exhibiting a pH of 7.1 or of 9.0 crosslinks at the same temperature as a comparative sample at pH 4.9. The storage moduli of the two samples at pH 4.9 and 9.0 are also virtually identical.

On the other hand, the stability on storage at ambient temperature of these three solutions is highly dependent on the pH. At 25° C., the viscosity of the solution at pH 4.9 doubles in about 21 days, whereas that of the solution at pH 7.1 increases by only 7% during this time and that of the solution at pH 9.0 increases by less than 4% in 21 days.

EXAMPLE 2

Aqueous poly(furfuryl alcohol) solutions having a dry matter content of 20% are prepared by dilution of BioRez™ resin and then their pH is adjusted by addition of aqueous ammonia ($NH_4OH$), of hexamethylenediamine (NMDA) or of polyethyleneimine (PEI, Lupasol FG) to basic pH (see table 1).

The crosslinking start temperature is determined by dynamic mechanical thermal analysis (DMTA), which makes it possible to characterize the viscoelastic behavior of a polymeric material. Two strips of paper made of glass microfibers are cut out and superimposed. Thirty milligrams of aqueous solution having a dry matter content of 20% are deposited homogeneously over the strips, which are then horizontally attached between two jaws of an RSAIII device (Texas Instruments). An oscillating component equipped with a device for measuring the stress as a function of the strain applied is positioned on the upper face of the sample. The device makes it possible to determine the modulus of elasticity E'. The sample is heated to a temperature varying from 20 to 250° C. at the rate of 4° C./min. The curve of variation in the modulus of elasticity E' (in MPa) as a function of the temperature (in ° C.) is plotted from the measurements, the general appearance of the curve being given in FIG. 1.

The DMTA curves are modelled in three straight-line segments:

1) tangent to the curve before the start of the reaction,
2) slope of the straight line during the increase in the modulus during reaction,
3) tangent to the curve after the end of the increase in the modulus.

The crosslinking start temperature (CST) is the temperature at the intersection of the first two straight lines.

The crosslinking start temperature for each of the samples prepared is shown in table 1 below.

TABLE 1

| Base added | pH | Crosslinking start temperature (DMTA, in ° C.) |
|---|---|---|
| None | 4.6 | 119 |
| NH$_4$OH | 7.1 | 121 |
| NH$_4$OH | 8.8 | 125 |
| HMDA | 7.1 | 119 |
| HMDA | 9.0 | 122 |
| PEI | 7.1 | 116 |
| PEI | 9.0 | 112 |

It is observed that the crosslinking start temperatures are not significantly increased by the addition of base. The system thus retains its reactivity under hot conditions, while being stabilized at ambient temperature.

EXAMPLE 3

Aqueous poly(furfuryl alcohol) solutions having a dry matter content of 20% are prepared by dilution of BioRez™ resin and then their pH is adjusted by addition of aqueous ammonia (NH$_4$OH), of hexamethylenediamine (NMDA) or of polyethyleneimine (PEI, Lupasol FG) to basic pH (see table 2).

Two series of glass fabrics are respectively impregnated with these aqueous binding compositions and then the fabrics are passed over a suction device which makes it possible to remove the surplus of solution. The impregnated glass fabrics are subsequently cured in a drying oven thermostatically controlled at 220° C. After cooking at 220° C. for 120 and 150 seconds, a sample is subjected to a determination of the tensile strength. For this, the fabrics are cut into bands (250 mm×50 mm) and their ends are inserted into the jaws of a tensile testing device.

The maximum force (in newtons) measured at the moment of failure is shown in table 2.

TABLE 2

| | pH | Cooking time | Maximum force at the moment of failure (N) |
|---|---|---|---|
| Biorez | 4.6 | 120 s | 93.6 |
| Biorez | 4.6 | 150 s | 93.5 |
| Biorez + NH$_3$ | 7.1 | 120 s | 92.6 |
| Biorez + NH$_3$ | 7.1 | 150 s | 91.9 |
| Biorez + NH$_3$ | 8.8 | 120 s | 79.6 |
| Biorez + NH$_3$ | 8.8 | 150 s | 85.2 |
| Biorez + HMDA | 7.1 | 120 s | 84.2 |
| Biorez + HMDA | 7.1 | 150 s | 85.6 |
| Biorez + HMDA | 9.0 | 120 s | 80.7 |
| Biorez + HMDA | 9.0 | 150 s | 81.3 |
| Biorez + PEI | 7.1 | 120 s | 101.8 |
| Biorez + PEI | 7.1 | 150 s | 94.7 |
| Biorez + PEI | 8.8 | 120 s | 98.4 |
| Biorez + PEI | 8.8 | 150 s | 100.6 |

It is found that all of the samples prepared exhibit satisfactory tensile strengths. The stabilization of the binder compositions by addition of a base up to basic pH is thus not reflected by a deterioration in the mechanical properties of the finished products.

The invention claimed is:

1. A process for manufacturing a product based on mineral or organic fibers which are bonded by an organic binder, said process comprising:
   (a) preparing a binding composition exhibiting a pH of greater than 7 by dilution with water of an aqueous poly(furfuryl alcohol) solution,
   (b) applying the binding composition to mineral or organic fibers,
   (c) forming an assemblage of mineral or organic fibers, wherein stage (b) precedes stage (c), and
   (d) heating the assemblage of mineral or organic fibers until curing of the binding composition,
   wherein the aqueous poly(furfuryl alcohol) solution comprises:
       from 40% to 85% by weight of poly(furfuryl alcohol);
       from 15% to 60% by weight of water; and
       less than 1.5% by weight of furfuryl alcohol, and
   wherein the aqueous poly(furfuryl alcohol) solution exhibits a pH of greater than 7.0.

2. The process as claimed in claim 1, wherein the stage (a) of preparing the binding composition additionally comprises the addition of adjuvants.

3. The process as claimed in claim 1, wherein stage (a) does not comprise the addition of an acid to the aqueous poly(furfuryl alcohol) solution.

4. The process as claimed in claim 1, wherein the assemblage of mineral or organic fibers is a woven or nonwoven textile, a mat of fibers, a board of fibers or a fiber-based molded product.

5. The process as claimed in claim 1, wherein the binding composition exhibits a dry matter content of between 2% and 20% by weight.

6. The process as claimed in claim 1, wherein the fibers are mineral fibers and the assemblage of mineral fibers exhibits, after the curing stage (d), a loss on ignition (LOT) of between 1% and 20%.

7. The process as claimed in claim 1, wherein stage (d) comprises the heating of the assemblage of mineral or organic fibers at a temperature of between 120 and 250° C. for a time of between 1 and 10 minutes.

8. A process for manufacturing a product based on mineral or organic fibers which are bonded by an organic binder, said process comprising:
(a) preparing a binding composition exhibiting a pH of greater than 7 by dilution with water of an aqueous poly(furfuryl alcohol) solution,
(b) applying the binding composition to mineral or organic fibers, before or after stage (b),
(c) forming an assemblage of mineral or organic fibers, and
(d) heating the assemblage of mineral or organic fibers until curing of the binding composition,
wherein the aqueous poly(furfuryl alcohol) solution comprises:
from 40% to 85% by weight of poly(furfuryl alcohol);
from 15% to 60% by weight of water; and
less than 1.5% by weight of furfuryl alcohol,
wherein the aqueous poly(furfuryl alcohol) solution exhibits a pH of greater than 7.0, and
wherein the binding composition exhibits a dry matter content of between 2% and 20% by weight.

9. The process as claimed in claim 8, wherein the stage (a) of preparing the binding composition additionally comprises the addition of adjuvants.

10. The process as claimed in claim 8, wherein stage (a) does not comprise the addition of an acid to the aqueous poly(furfuryl alcohol) solution.

11. The process as claimed in claim 8, wherein the assemblage of mineral or organic fibers is a woven or nonwoven textile, a mat of fibers, a board of fibers or a fiber-based molded product.

12. The process as claimed in claim 8, wherein the binding composition exhibits a dry matter content of between 2.5% and 15% by weight.

13. The process as claimed in claim 8, wherein the fibers are mineral fibers and the assemblage of mineral fibers exhibits, after the curing stage (d), a loss on ignition (LOI) of between 1% and 20%.

14. The process as claimed in claim 8, wherein stage (d) comprises the heating of the assemblage of mineral or organic fibers at a temperature of between 120 and 250° C. for a time of between 1 and 10 minutes.

15. A process for manufacturing a product based on mineral fibers which are bonded by an organic binder, said process comprising:
(a) preparing a binding composition exhibiting a pH of greater than 7 by dilution with water of an aqueous poly(furfuryl alcohol) solution,
(b) applying the binding composition to mineral fibers, before or after stage (b),
(c) forming an assemblage of mineral fibers, and
(d) heating the assemblage of mineral fibers until curing of the binding composition,
wherein the aqueous poly(furfuryl alcohol) solution comprises:
from 40% to 85% by weight of poly(furfuryl alcohol);
from 15% to 60% by weight of water; and
less than 1.5% by weight of furfuryl alcohol, and
wherein the aqueous poly(furfuryl alcohol) solution exhibits a pH of greater than 7.0, and
wherein the assemblage of mineral fibers exhibits, after the curing stage (d), a loss on ignition (LOI) of between 1% and 20%.

16. The process as claimed in claim 15, wherein the stage (a) of preparing the binding composition additionally comprises the addition of adjuvants.

17. The process as claimed in claim 15, wherein stage (a) does not comprise the addition of an acid to the aqueous poly(furfuryl alcohol) solution.

18. The process as claimed in claim 15, wherein the assemblage of mineral fibers is a woven or nonwoven textile, a mat of fibers, a board of fibers or a fiber-based molded product.

19. The process as claimed in claim 15, wherein the binding composition exhibits a dry matter content of between 2% and 20% by weight.

20. The process as claimed in claim 15, wherein the assemblage of mineral fibers exhibits, after the curing stage (d), a loss on ignition (LOI) of between 1% and 7%.

21. The process as claimed in claim 15, wherein stage (d) comprises the heating of the assemblage of mineral fibers at a temperature of between 120 and 250° C. for a time of between 1 and 10 minutes.

* * * * *